United States Patent
Watanabe

(10) Patent No.: US 7,254,096 B2
(45) Date of Patent: Aug. 7, 2007

(54) REPRODUCING APPARATUS, METHOD FOR CONTROLLING REPRODUCTION AND CONTROLLING PROGRAM FOR REPRODUCTION

(75) Inventor: Isao Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 693 days.

(21) Appl. No.: 10/714,888

(22) Filed: Nov. 18, 2003

(65) Prior Publication Data

US 2004/0101289 A1     May 27, 2004

(30) Foreign Application Priority Data

Nov. 27, 2002    (JP)    ............................. 2002-343198

(51) Int. Cl.
*G11B 31/00*    (2006.01)
*H04N 5/781*    (2006.01)

(52) U.S. Cl. ...................... 369/21; 386/125; 386/126

(58) Field of Classification Search .................. 369/21, 369/1; 701/35–36, 66; 702/142; 386/125, 386/126, 105, 98–99; 360/48, 72.2; 84/611
See application file for complete search history.

(56) References Cited

U.S. PATENT DOCUMENTS 6,539,167 B2 * 3/2003 Mori et al. .................... 386/98
6,549,723 B2 * 4/2003 Mori et al. .................... 386/98

* cited by examiner

*Primary Examiner*—Ali Neyzari
(74) *Attorney, Agent, or Firm*—Oblon, Spivak, McClelland, Maier & Neustadt, P.C.

(57) ABSTRACT

Providing a reproducing apparatus of an in-car disk player, a method and a program for controlling reproducing apparatus. The reproducing apparatus, which is portable and can be carried home, has reproducing means for reproducing data recorded in a disk-shaped recording medium, a sensor section for detecting the state of a vehicle, and control means for changing a reproducing speed of the reproducing means based on the result detected by the sensor section, and can surely copy data recorded in an optical disk to a recording apparatus such as a hard disk drive apparatus, even inside a vehicle, without an excessive vibration countermeasure such as cushions, by changing a reproduction speed of a disk-shaped recording medium.

4 Claims, 4 Drawing Sheets

REPRODUCING APPARATUS, METHOD FOR CONTROLLING REPRODUCTION AND CONTROLLING PROGRAM FOR REPRODUCTION

CROSS REFERENCE TO RELATED APPLICATIONS

The present document is based on Japanese Priority Document JP2002-343198 filed in the Japanese Patent Office on Nov. 27, 2002, the entire contents of which being incorporated herein by reference.

BACKGROUND OF THE INVENTION

1. Technical Field of the Invention

The present invention is related to a reproducing apparatus, a method for controlling a reproduction and a program for reproduction. The present invention can be applied to, for example, a portable optical disk player, which is installed inside automobile and can be carried home.

2. Description of Related Art

Conventionally, a computer is capable of copying various data provided from a CD-ROM or the like to a hard disk drive apparatus therein and uses the data copied. On the other hand, the computer is also capable of recording various data, such as data recorded in the hard disk drive apparatus and data made by various application programs, to an optical disk for storing.

In such application programs used for recording and reproducing data to and from an optical disk, a speed of reading or writing data can be selected according to need, so as to ensure execution of reading or writing process, for example, even to and from a low quality optical disk.

On the other hand, an in-car optical disk player is made to be suitable for using inside a vehicle, even during bumpy rides, to listening to the music or searching a map by virtue of having enough vibration mechanism, such as cushions.

In addition, a portable magneto-optical disk apparatus, which is used for an audition of audio signal data, reproduces data at high speed as compared to a normal reproducing speed, and outputs the reproduced data through a high capacity buffer memory, so that the sound-skipping is effectively avoided.

On the other hand, for example, in Japanese Patent Application Publication No. 2002-42406 disclosed in Japan, an in-car DVD player is proposed, which stops reproducing a DVD by detecting start of driving in order to keep safe driving.

[Patent Document 1]
Japanese Patent Application Publication No. 2002-42406

SUMMARY OF THE INVENTION

In late years, a hard disk drive apparatus has been downsized, and has had a high capacity, and also secures an enough vibration ability. For these reasons, as an in-car device, a hard disk drive apparatus is conceivable to use as a storage device. In addition, it is also conceivable that such an in-car device using a hard disk drive apparatus can be used as similar to a computer, for example, using map data or the like by copying from an optical disk apparatus to the hard disk drive apparatus of the in-car device.

If such an optical disk player is possible to be detached from a vehicle and carried around, it will be convenient because such an optical disk player can also be used separately, for example, using at home. However, there is a concern that if the optical disk player employs an excessive vibration countermeasure mechanism such as cushions in order to use suitably inside a vehicle, portability thereof may be reduced.

The present invention was made in view of the above mentioned problem, and provides a reproducing apparatus that is able to copy data recorded in an optical disk to a hard disk drive apparatus, even inside a vehicle, without an excessive vibration countermeasures such as a cushions, and also provides a method for controlling reproduction and a controlling program for reproduction.

In a first aspect of the present invention, the invention is applied to a reproducing apparatus, which is portable and installable on a vehicle, for outputting data recorded in a disk-shaped recording medium to recording means. The reproducing apparatus has reproducing means for reproducing data recorded in the disk-shaped recording medium, a sensor section for detecting the driving state of the vehicle, and control means for changing a reproducing speed of the reproducing means based on the result detected by the sensor section.

Further, in a second aspect of the present invention, the invention is applied to a reproducing apparatus, which is portable and installable on a vehicle, for outputting data recorded in a disk-shaped recording medium to recording means. The reproducing apparatus has reproducing means for reproducing data recorded in the disk-shaped recording medium, a sensor section for detecting whether the reproducing apparatus is installed on the vehicle or not, and control means for changing a reproducing speed of the reproducing means based on the result detected by the sensor section.

Furthermore, in a third aspect of the present invention, the invention is applied to a method for controlling a reproducing apparatus, which is portable and installable on a vehicle, for outputting data recorded on a disk-shaped recording medium to recording means. The method has the steps of determining the driving state of vehicle based on the result detected by a sensor section, changing a reproducing speed of the reproducing means, which reproduces data recorded in the disk-shaped recording means according to the result detected by the determining step.

Furthermore, in a fourth aspect of the present invention, the invention is applied to a method for controlling a reproducing apparatus, which is portable and installable on a vehicle, for outputting data recorded on a disk-shaped recording medium to recording means. The method has the steps of determining whether the reproducing apparatus is installed on a vehicle or not based on the result detected by a sensor section, changing a reproducing speed of the reproducing means, which reproduces data recorded in the disk-shaped recording means according to the result detected by the determining step.

Furthermore, in a fifth aspect of the present invention, the invention is applied to a controlling program to execute a predetermined process by a computer that controls operations of a reproducing apparatus, which is portable and installable on a vehicle, for outputting data recorded on a disk-shaped recording medium to recording means. The predetermined process of the controlling program has the steps of determining the driving state of vehicle based on the result detected by a sensor section, changing a reproducing speed of the reproducing means, which reproduces data recorded in the disk-shaped recording means according to the result detected by the determining step.

Furthermore, in a sixth aspect of the present invention, the invention is applied to a controlling program to execute a predetermined process by a computer that controls operations of a reproducing apparatus, which is portable and installable on a vehicle, for outputting data recorded on a disk-shaped recording medium to recording means. The predetermined process of the controlling program has the steps of determining whether the reproduction apparatus is installed on a vehicle or not based on the result detected by a sensor section, changing a reproducing speed of the reproducing means, which reproduces data recorded in the disk-shaped recording means according to the result detected by the determining step.

According to the first aspect of the present invention, the invention is applied to a reproducing apparatus, which is portable and installable on a vehicle, for outputting data recorded in a disk-shaped recording medium to recording means. The reproducing apparatus has reproducing means for reproducing data recorded in the disk-shaped recording medium, a sensor section for detecting the driving state of the vehicle, and control means for changing a reproducing speed of the reproducing means based on the result detected by the sensor section. Thus, if frequent occurrences of errors would be expected due to vibrations of the vehicle, the reproducing apparatus changes its reproduction speed to reduce the occurrence of errors. Therefore, data recorded in an optical disk can surely be copied to a recording apparatus such as a hard disk drive apparatus, even inside a vehicle, without an excessive vibration countermeasure such as cushions.

Further, according to the second aspect of the present invention, the invention is applied to a reproducing apparatus, which is portable and installable on a vehicle, for outputting data recorded in a disk-shaped recording medium to recording means. The reproducing apparatus has reproducing means for reproducing data recorded in the disk-shaped recording medium, a sensor section for detecting whether the reproducing apparatus is installed on the vehicle or not, and control means for changing a reproducing speed of the reproducing means based on the result detected by the sensor section. Thus, if frequent occurrences of errors would be expected due to vibrations of the vehicle, similar to the above, the reproducing apparatus changes its reproduction speed to reduce the generation of errors. Therefore, data recorded in an optical disk can surely be copied to a recording apparatus such as a hard disk drive apparatus, even inside a vehicle, without an excessive vibration countermeasure such as cushions.

According to the third aspect and the forth aspect, or the fifth aspect and the sixth aspect, the present invention can provide the controlling method and program of the reproduction apparatus, which enable a copy operation in which data recorded in an optical disk can surely be copied to a recording apparatus such as a hard disk drive apparatus, even inside a vehicle, without an excessive vibration countermeasure such as cushions.

As described above, the present invention provides a reproducing apparatus which can copy data recorded in an optical disk or the like to a storage device such as a hard disk drive, even inside a vehicle, with only simple vibration countermeasure or without an excess vibration countermeasure such as cushions, by changing a reproduction speed of a disk-shaped recording medium by according to the detection of installation of the reproducing apparatus onto a vehicle or the state of a vehicle.

DETAILED DESCRIPTION OF THE PREFERRED EMBODIMENTS

Hereinafter, detailed descriptions of the preferred embodiments of the present invention are explained with reference to accompanying drawings.

(1-1) Configuration of First Embodiment

Figure 2:
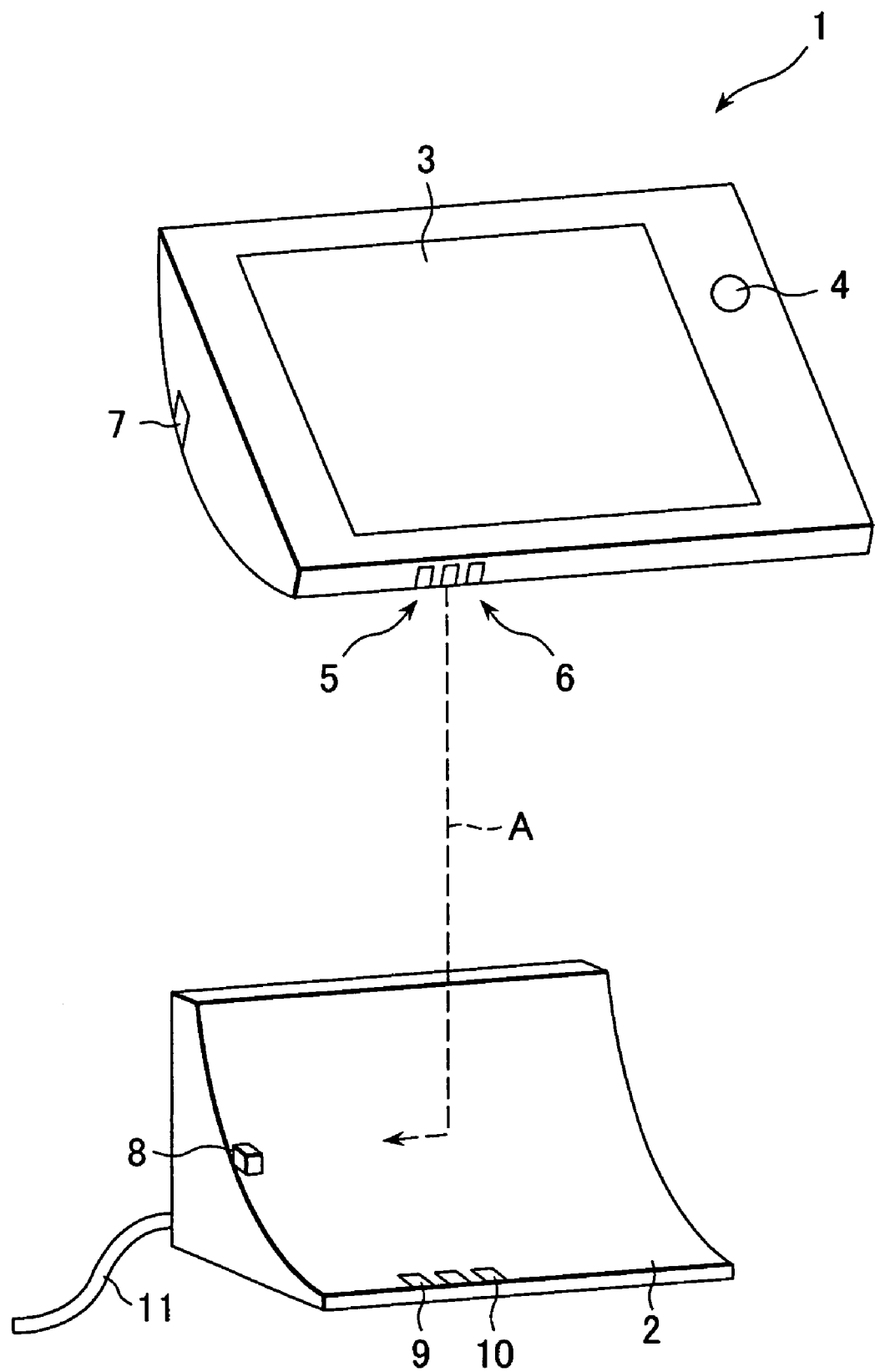
FIG. 2 is a perspective view showing an information processor in the first embodiment of the present invention.

FIG. 2 is a perspective view showing an in-car information processor of a first embodiment of the present invention. An information processor 1 is configured to be portable, so that it is possible to be used at home, in outdoors, or inside a vehicle for many purposes such as navigating roads while looking maps, enjoying music and movies, and the like. In addition, when the information processor 1 is used inside a vehicle, it is installed on a cradle 2 attached to a dashboard of the vehicle, and used for various purposes similar as above.

To install onto the cradle 2 attached to the dashboard, the information processor 1 is formed into a thin plate shape, a display 3 made of a liquid-crystal display panel, a power switch 4, and the like are disposed on the front surface thereof. In addition, the information processor 1 has the lower end surface on which a power source terminal 5 for providing power through the cradle 2, and a communication terminal 6 for inputting and outputting various kinds of information between the vehicle through the cradle 2 are provided. The back surface of the information processor is formed to be curved, a switch 7 is provided on the end portion of the curved surface for detecting the installation of the information processor onto the cradle 2. Incidentally, in addition to the above, the information processor 1 has a sensor for detecting operations of a remote commander, a speaker for outputting sounds or the like, a slot for inserting and removing a magneto-optical disk, and the like.

Corresponding to the configuration of the information processor 1, the cradle 2 has a curved surface facing the curved surface of the information processor 1 in order to fit for the back surface shape of the information processor 1, so that the cradle 2 holds the information processor 1 at inclined position. On the curved surface of the cradle 2, a protrusion 8 is provided at a portion corresponding to the switch 7 of the information processor 1. In addition, a hook, which is not shown, is provided to secure the holding mechanism for the information processor 1. The information processor 1 can be installed onto the cradle 2 in that the information processor 1 is brought and slid onto the cradle 2 in the direction of an arrow A as shown, and is hooked on the hook to be securely held. In addition, the information processor 1 is detached from the cradle 2 by sliding back from the hook to release and can be carried around. Further, when the information processor 1 is held in this way, because the protrusion 8 presses the switch 7, the information processor 1 can detect the installation onto the cradle.

In addition, the cradle 2 has a power supplying terminal 9 and a communicating terminal 10, which are connected to the predetermined positions of the vehicle through a cable 11. When the cradle 2 holds the information processor 1, these terminals 9 and 10 contact to the corresponding terminals 5 and 6 of the information processor 1, whereby power is supplied to the information processor 1 from a power source of the vehicle, and also various kinds of data can be inputted and outputted between the vehicle and the information processor 1.

Figure 3:
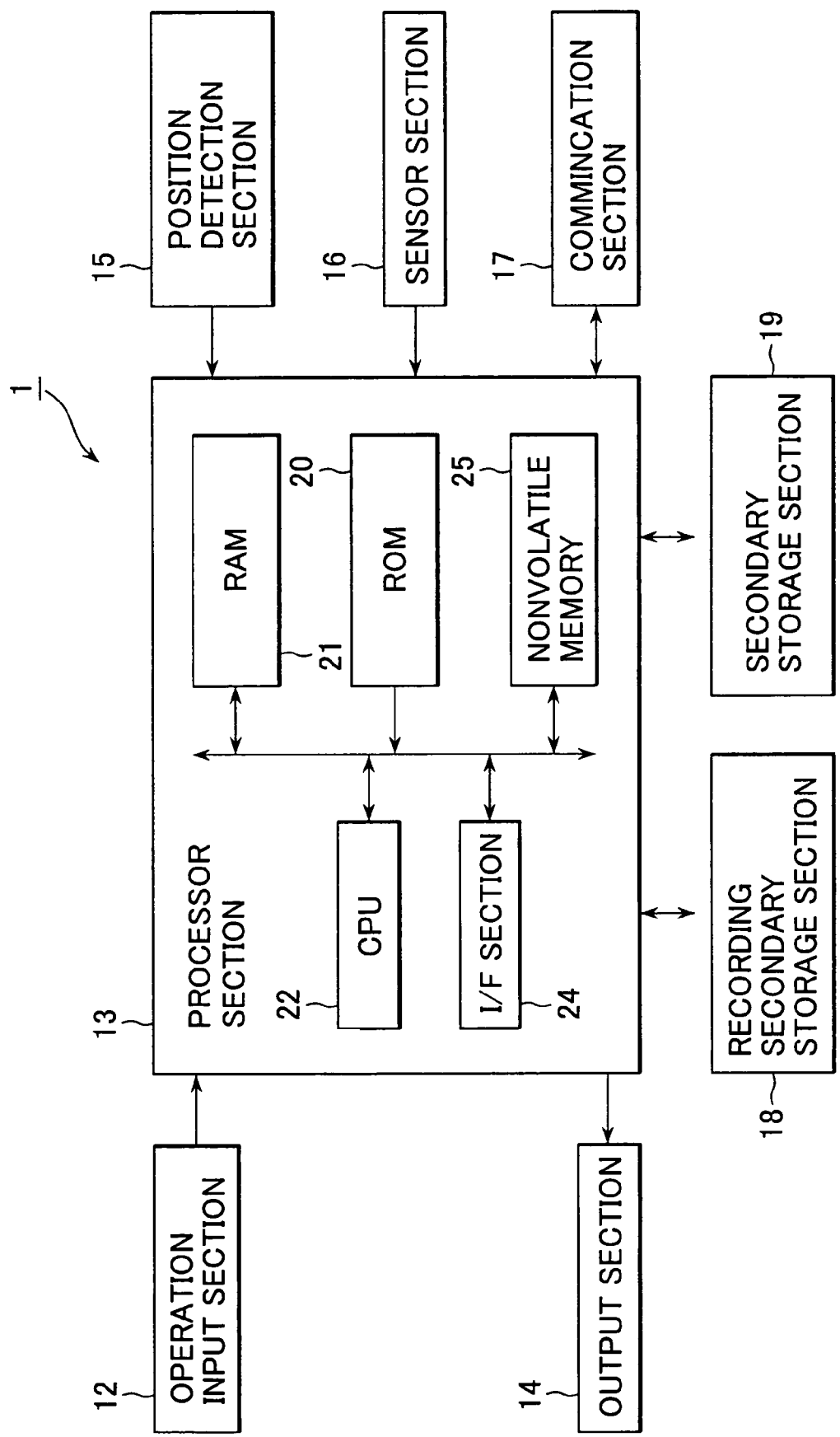
FIG. 3 is a block diagram showing the information processor of FIG. 2.

FIG. 3 is a block diagram showing a configuration of the information processor 1. In the information processor 1, an operation input section 12 detects operations of a user and notifies them to a processor section 13. Specifically, the operation input section 12 is constituted of a power switch 4, a receiver of the remote commander, and the like, so that the information processor 1 can control a power source through operations of the power switch 4, and can change actions through operations of the remote commander. In addition to these, the operation input section may be constituted of a touch panel provided on the display 3, voice input means to obtain voices from a microphone, image input means using an imaging device and the like. Incidentally, in the case where the voice input means and the image input means are employed, a voice recognition process and an image recognition process are needed to be carried out by the processor section 13 in order to process voices and images inputted.

An output section 14 transmits to a user the result of various data processed by the processor section 13. In the information processor 1, the output section 14 is constituted of the display 3, which is image output means, and a speaker, which is voice output means.

A position detecting section 15 detects a current position and notifies it to the processor section 13. In the information processor 1, the position detecting section 15 is constituted of a GPS (Global Positioning System) positioning apparatus, whereby it can be used for navigating roads.

A sensor section 16 detects a driving state of the vehicle installing the information processor 1, and notifies the state to the processor section 13. Specifically, in this embodiment, if a vehicle speed pulse, which indicates a number of revolutions of wheels, is inputted from the vehicle to the sensor 16 through the terminal 10 by installing the information processor 1 onto the cradle 2, the sensor 16 notifies the vehicle speed pulse to the processor section 13, and the processor section 13 can detect driving motions of the vehicle.

A communication section 17 is communication means with other equipments directly or through a LAN (Local Area Network), or through a WAN (Wide Area Network), and it is constituted of, for example, cable transmission means such as a USB (Universal Serial Bus), a portable telephone, wireless communication means such as a Bluetooth, and off-line communications means such as a memory card, and the like.

A recording secondary storage section 18 is high capacity storage means capable of recording and reproducing data, which is constituted of a hard disk drive apparatus in this embodiment. The recording secondary storage section 18 records and holds data such as map data, music content data, image content data such as movies, data using for various searches, and data using for POI (Point Of Interface), which controls functions of a portable telephone at the communication section 17.

A secondary storage section 19 is high capacity recording means dedicated for reproducing to which an optical disk player is applied in this embodiment, and reproduces an optical disk such as a CD (Compact Disc), a CD-ROM (Compact Disc Read Only Memory) and a DVD (Digital Video Disk). The secondary storage section 19 reproduces data in the optical disk and outputs the reproduced data under control of the data processing section 13. In this reproducing process, the secondary storage section 19 changes a reproduction speed from 24×-speed to 4×-speed through control of the processing section 13, thus reproduction speed is decreased so as to reduce errors caused by vibrations of the vehicle. Incidentally, errors may be reduced remarkably when the reproduction speed is decreased by decreasing bands of a tracking control and of a focus control and increasing a transmission gain according to the degradation of the reproduction speed.

The processor section 13 is a computer for controlling actions of the information processor 1, which secures a work area in a random-access memory (RAM) 21 and executes a processing program recorded in a read only memory (ROM) 20 by a central processing unit (CPU) 22. In accordance with the process executed, the processor section 13 changes actions according to operations applied to the operations input section 12, which is detected through an interfacing (I/F) section 24, and outputs the processed results to the output section 14 through the interfacing section 24. Incidentally, the processing program described above may be recorded to a static RAM (SRAM) backed up with a battery or to a nonvolatile memory 25 such as a flash memory or the like. In this case, the processing program to be executed by the processor section 13 can be updated by updating data of the nonvolatile memory 25 with a program supplied from the secondary storage section 19 or a program downloaded in the communication section 17. Incidentally, in this embodiment, the processing program is recorded to the read only memory 20, so that the processing program is previously recorded to the processing section 13 before shipping.

When a user orders the information processor 1 to reproduce music content or image content through the remote commander, the central processing unit 22 carries out the process described above, that is, displaying lists of the music content and the image content, which are recorded in the recording secondary storage section 18 and in the secondary storage section 19, on the display 3 to the user to select. According to the user's selection from the list displayed, the central processing unit 22 reproduces and outputs the corresponding content through the output section 14. Further, when the user orders to display a map, the central processing unit 22 reproduces and processes map data recorded in the recording secondary storage section 18 to display the map of the place where the user required on the display 3. In addition, when the user orders to navigate roads, the central processing unit 22 carries out a searching process based on positional information of a current position detected by the position detecting section 15 to find routes to destinations and displays the maps searched result on the display 3, thereby navigating the user. When the user orders to search a famous restaurant or the like, the central processor unit 22 searches to searching data recorded in the recording secondary storage section 18 and displays the searched results on the display 3, in similar manner as above. Further, according to the user's orders, the central processing unit 22 connects to the network or the like through the communication section 17 to obtain electronic mails or homepages required, and displays them on the display 3, in similar manner as above.

On the other hand, when updating the data recorded in the secondary storage section 19, such as the map data, the searching data and the like, with an optical disk is ordered, the central processing unit 22 commands the secondary storage section 19 to reproduce the optical disk, and detects data needed for updating by comparing data recorded in the optical disk and in the recording secondary storage section 18. After that, the central processing unit 22 commands the secondary storage section 19 to reproduce the detected data needed for updating and also commands the recording secondary storage section 18 to record the data reproduced by the secondary storage section 19. Thus, in the information processor 1, data recorded in the optical disk can be copied to the recording secondary storage section 18.

In addition, when the user orders to copy music content and movie content, the central processing unit 22 commands the secondary storage section 19 to reproduce an optical disk and displays content that can be copied to the user to select, and then commands the secondary storage section 19 to reproduce the content according to the user's selection. Next, the central processing unit 22 commands the recording secondary storage section 18 to record the content reproduced by the secondary storage section 19. Thus, in the information processor 1, the music content and the image content recorded in the optical disk can be copied to the recording secondary storage section 18.

Figure 1:
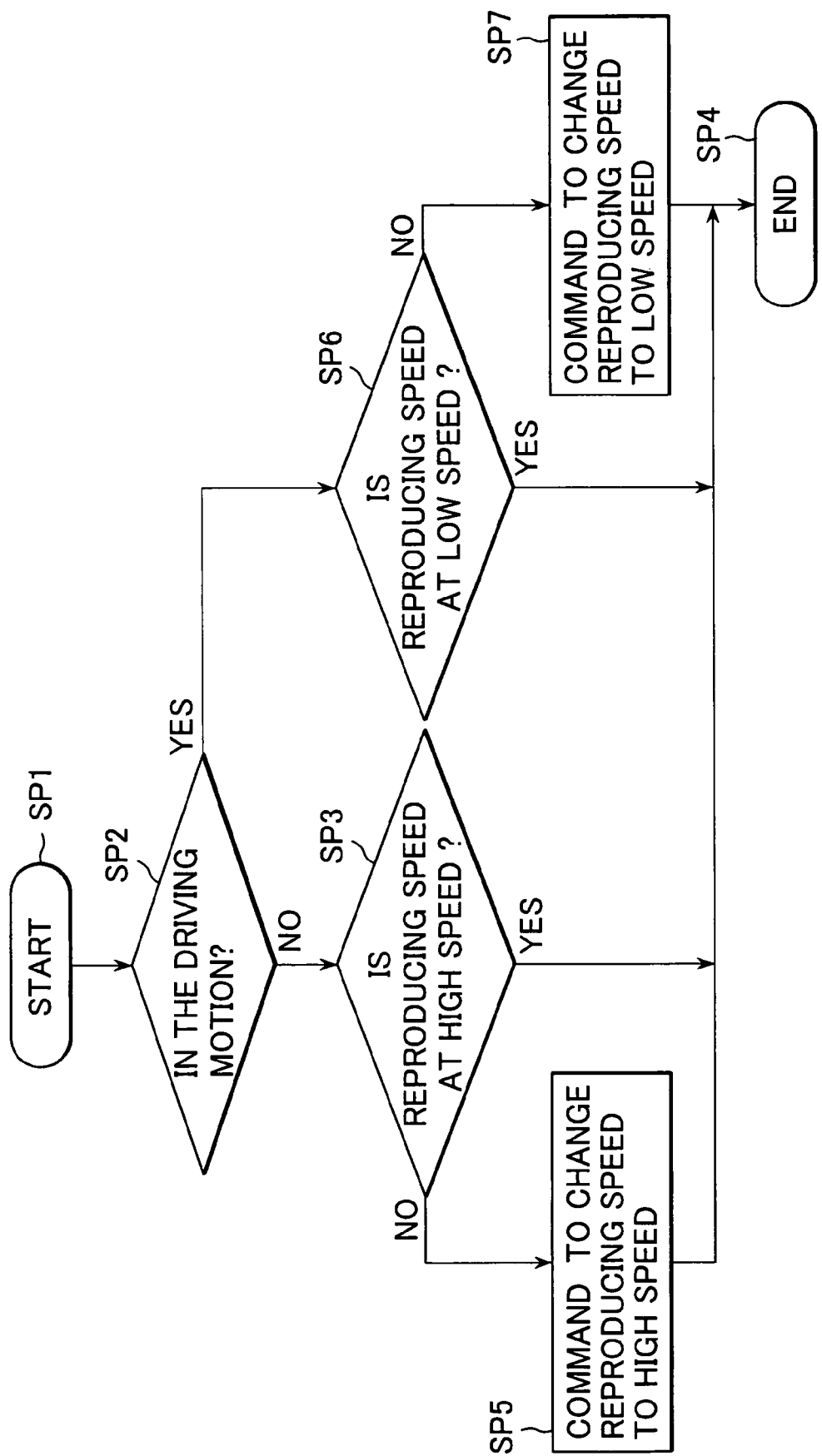
FIG. 1 is a flow chart showing a process of a central processing unit in an information processor in the first embodiment of the present invention.

The copy operation described above is carried out at regular intervals as a process shown in FIG. 1, while the central processing unit 22 is detecting the installation of the information processor 1 onto the cradle 2 through the switch 7. The central processing unit 22 changes the copy speed depending on the driving state of the vehicle on which the information processor 1 is placed. Specifically, the central processing unit 22 proceeds from step SP1 to step SP2 and determines whether the vehicle is in a driving motion or not based on the detection result of the vehicle speed pulse by a sensor section 16. When the detected result is negative, which is "not in the driving motion", the central processing unit 22 proceeds from step SP2 to step SP3 and determines whether current reproduction of the secondary storage section 19 is carried out at a high speed reproduction mode of a 24×-speed or not. When the detected result is positive, which is "at the high speed reproduction mode", the central processing unit 22 proceeds from step SP3 to step SP4 and finishes this process. On the contrary, when negative result is obtained at step SP3, which is "not at a high speed reproduction mode", the central processing unit 22 proceeds from step SP3 to step SP5 and commands the secondary storage section 19 to change the reproduction speed to the 24×-speed, and proceeds to step SP4 to finish this process. Thus, in the information processor 1, when the vehicle is not in the driving motion, data is reproduced at 24×-speed and recorded to the secondary storage section 18, thereby the data of the optical disk can be copied at high speed.

On the contrary, when the result is positive at the step SP2, which is "in the driving motion", the central processing unit 22 proceeds from step SP2 to step SP6. Here, the central processing unit 22 determines whether the current reproduction speed of the secondary storage part 19 is a low speed of 4×-speed or not. When the result is positive, which is "at the low speed reproduction mode", the central processing unit 22 proceeds from step SP6 to step SP4 to finish this process. On the other hand, when negative result is obtained at step SP6, which is "not at the low speed reproduction mode", the central processing unit 22 proceeds from step SP6 to step SP7 and commands the secondary storage section 19 to change the reproduction speed to 4×-speed, and then proceeds to step SP4 to finish this process. Thus, in the information processor 1, when the vehicle is in the driving motion, the data reproduced at 4×-speed is recorded to the recording secondary storage section 18, that is, the data of the optical disk is copied at the low speed mode. Incidentally, when the central processing unit 22 does not detect the state in which the installation of the information processor 1 onto the cradle 2, the copy operation of the content is carried out at the high speed of 24×-speed.

Figure 4:
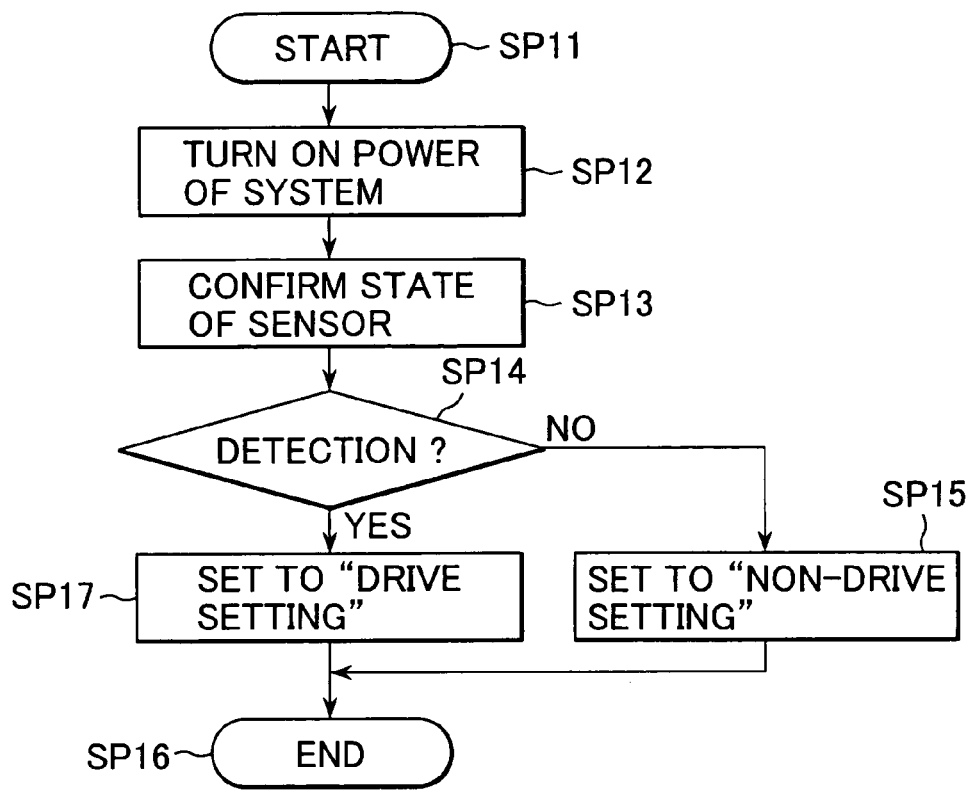
FIG. 4 is a flow chart showing a process from turning on a power source to determining state of a vehicle.

FIG. 4 is a flow chart of a process of the central processing unit 22, which shows from turning on power of the information processor 1 and determining whether the vehicle is in the driving motion or not. When the user turns on the switch 4, the central processing unit 22 proceeds from SP11 to step SP12 and starts up the whole system. Successively, the central processing unit 22 proceeds to step SP13 and obtains the detective result of the vehicle speed pulse from the sensor section 16 to detect the current state of the vehicle, and determines whether the vehicle is in the driving motion or not at step SP14. When the result is negative, which is "not in driving motion", the central processing unit 22 proceeds to step SP15 to set the reproduction speed of the secondary storage section 18 at 24×-speed, which is for "the non-drive setting", and proceeds to Step SP16 to finish this process. On the contrary, when result is positive at step SP14, which is "in the driving motion", the processing unit 22 proceeds to step SP17 to set the reproduction speed of the secondary storage section 18 at 4×-speed, which is for "the drive setting", and then proceeds to step SP16 to finish this process.

(1-2) Operations of the First Embodiment

In the above-mentioned configuration, when a user carries and brings the information processor 1 (FIG. 2) into the vehicle and placed it onto the cradle 2 provided in the vehicle, the switch 7 positioned on the back surface of the information processor 1 detects the installation on the cradle 2, and power is supplied from the vehicle through the terminal 9. Thus, according to the user's operation, the information processor 1 (FIG. 3) reproduces the music content or the image content, which are recorded in the recording secondary storage section 18, which is a hard disk drive and in the secondary storage section 19, which is an optical disk player, are reproduced and provided to a user. In addition, the music content and the image content recorded in the secondary storage section 19 are reproduced to be copied to the recording secondary storage section 18.

When the content is copied from the secondary storage section 19 to the recording secondary storage section 18, the vehicle speed pulse is inputted from the vehicle to the information processor 1 through the terminal 10 and to be detected by the sensor section 16 that notifies it to the data processing section 13. In the case where the data processing section 13 detects the vehicle speed pulse in this way, the reproduction speed of the secondary storage section 19 is changed to 4×-speed, that is, data reproduced by the secondary storage section 19 is copied to the recording secondary storage section 18 at low speed. In the case where the vehicle speed pulse is not detected, the reproduction speed of the secondary storage section 19 is changed to 24×-speed, that is, the data reproduced by the secondary storage section 19 is copied to the recording secondary storage section 18 at high speed.

In other words, for the reason that the vehicle speed pulse is generated with synchronizing for revolutions of wheels, it can be determined that the vehicle is in the driving motion when the vehicle speed pulse is detected, and on the contrary, it can be determined that the vehicle is in the stopping motion when the vehicle speed plus is not detected. In addition, when playing an optical disk player inside the vehicle during driving, loss of tracking or defocusing often tend to occur because of vibrations caused from bumpy roads, thereby increasing generation of errors. However, when frequent occurrences of such errors by vibrations are predicted, if reproduction speed is changeable, such vibration caused error occurrences during driving can be reduced. Thus, the data recorded in the optical disk can be surely copied inside the vehicle subject to such vibrations without a need for excessive vibration countermeasures, such as cushions or the like. Further, the data can be copied stably while the vehicle is in the stopping motion, the copy operation can be carried out at high speed and surely completed in a short time. In the information processor 1, the state of the vehicle is determined by detecting whether the vehicle is driving or not, the reproduction speed for the copy operation can be changed.

(1-3) Effects of the First Embodiment

According to the above-mentioned configuration, the data recorded in the optical disk can be surely copied to a recording apparatus, such as a hard disk drive, even inside the vehicle without a need for excessive vibration countermeasures, such as cushions or the like, by detecting motion of the vehicle installing the information processor 1 and then changing the reproduction speed of a disk-shaped recording medium.

(2) The Second Embodiment

In this embodiment, an information processor changes a copy speed by detecting whether the information processor is installed onto a vehicle or not through a switch 7 instead of detecting a vehicle speed pulse through a sensor section. Incidentally, the information processor of the second embodiment is configured similar to the information processor of the first embodiment except controlling a copy operation is different. The configuration of the second embodiment will be explained with reference to the configuration in FIG. 3.

Since the copy speed is changed by detecting whether the information processor is installed onto the vehicle or not through the switch 7, a central processing unit 22 detects on/off status of the switch 7 before starting the copy operation, thereby detecting presence of the information processor onto a cradle 2. When the detected result is that the information processor is installed onto the cradle 2, the central processing unit 22 sets the reproduction speed of a secondary storage section 19 at low speed because frequent occurrences of errors would be expected once the vehicle starts moving. On the contrary, the detected result is that the information processor is not installed onto the cradle 2, the central processing unit 22 sets the reproduction speed of the secondary storage section 19 at high speed.

Figure 5:
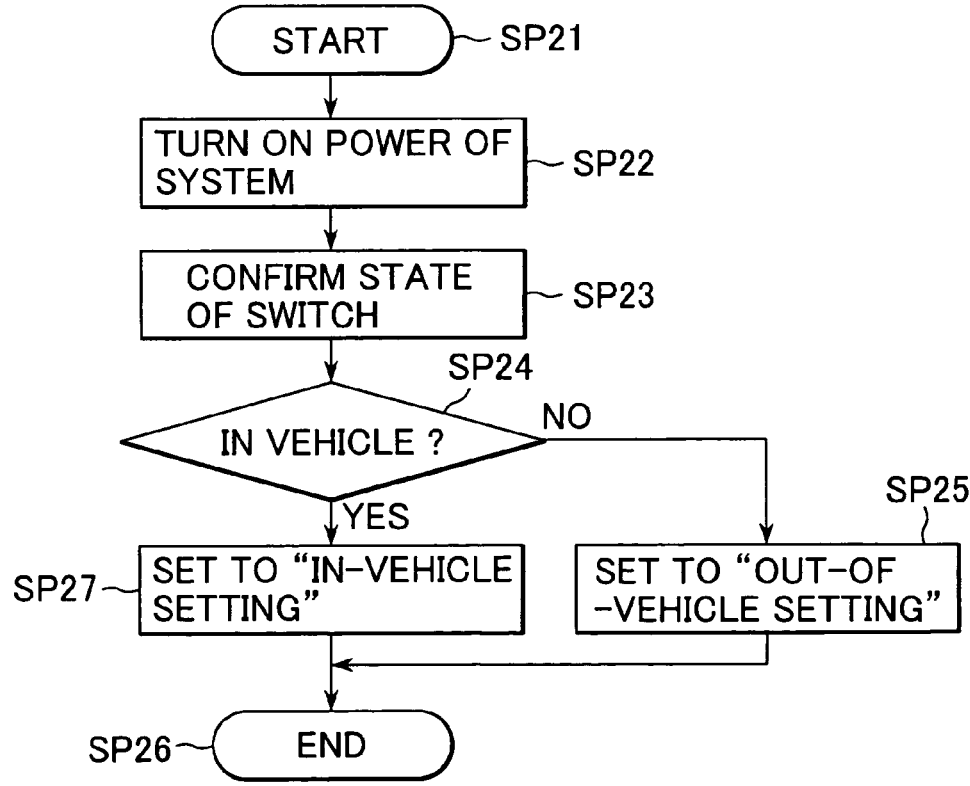
FIG. 5 is a flow chart showing a process from turning on a power source to determining whether an information processor is installed or not in the second embodiment of the present invention.

As compared with FIG. 4, a flow chart of a process of the central processing unit 22 in FIG. 5 is shown, the process from turning on power of the information processor to determining whether the information processor 1 is installed on the vehicle or not. When a user turns on the switch 4, the central processing unit 22 proceeds from step SP21 to step SP22 and starts up the whole system. Successively, the central processing unit 22 proceeds to step SP23 to obtain the detective result of on/off status of the switch 7, and determines whether the information processor is installed on the vehicle or not at step SP24. When the result is negative, which is "not installed on the vehicle", the central processing unit 22 proceeds to Step SP25 to set the reproduction speed of the secondary storage section 18 at 24×-speed, which is for "out-of-the vehicle setting", and proceeds to step SP26 to finish the process. On the contrary, when the result is positive at step SP24, which is "installed on the vehicle", the processing unit 22 proceeds to step SP27 to set the reproduction speed of the secondary storage section 19 at 4×-speed, which is for "in the vehicle setting", and then proceeds to step SP26 to finish the process.

According to the configuration of the second embodiment, the data recorded in the optical disk can be surely copied to the recording apparatus such as a hard disk drive, even inside a vehicle, without the need for any excessive vibration countermeasures such as cushions or the like, by detecting whether the information processor 1 is installed on the vehicle or not and then changing the reproduction speed of a disk-shaped recording medium.

(3) Other Embodiments

In the first embodiment described above, the case of determining whether the vehicle is in the driving motion or not by detecting the vehicle speed plus is explained, however, the present invention is not limited to this. The state, in which the vehicle is in the driving motion or not, may also be determined by detecting operations of a parking brake switch or a brake lamp switch of the vehicle.

In addition, in the first embodiment, the case of determining the vehicle state by detecting whether the vehicle is in the driving motion or not is explained, however, the present invention is not limited to this. The vehicle state may be determined by detecting whether the behavior of the vehicle is rough or not. Such behavior of the vehicle can be determined from the detection results of a throttle opening sensor, an accelerator opening sensor, and a steering rudder angle sensor that detects the operations of a steering, a slot and an accelerator. Further, the detection results of a vibration gyroscope sensor for detecting a turning angle velocity of vehicle body, an acceleration sensor for detecting an acceleration of the vehicle and a vibration sensor for detecting vibrations of the vehicle are obtained in order to determine the state of the vehicle. These vibration gyroscope sensor and the like may be built into the information processor. Further, instead of the detection of vehicle behavior, acceleration and the like, the state of the vehicle may be determined by detecting a power source noise or noises from a noise microphone.

Further, in the embodiments described above, the case where reproduction speed is changed to the two stages are explained, however, the present invention is not limited to this. The reproduction speed may be changed to more than three stages depending on the scale of vibrations.

Furthermore, in the embodiments described above, the cases where data is copied from an optical disk player to a hard disk drive apparatus are explained, however, the present invention is not limited to this. The present invention can be widely applied to cases where data reproduced from various kinds of disk-shaped recording medium, such as a magneto-optical disk and a hard disk drive, instead of the optical disk record player, and copied to a hard disk drive apparatus, further, to a case where data is copied to other recording mediums, such as memories or the like, other than the hard disk drive apparatus.

Furthermore, in the embodiments described above, the case where the processing program is recorded to a read only memory in advance to provide is explained, however, the present invention is not limited to this. The present invention can be widely applied to the cases, for example, a case where a program is downloaded through a network, such as the internet, and installed to execute this kind of the process, further, a case where installing programs are provided from various recording medium and to execute this kind of the process. Incidentally, a magnetic disk, an optical disk and a magnetic tape can be applied as such recording medium.

Finally, the embodiments and examples described above are only examples of the present invention. It should be noted that the present invention is not restricted only to such embodiments and examples, and various modifications, combinations and sub-combinations in accordance with its design or the like may be made without departing from the scope of the present invention.

What is claimed is:

1. A reproducing apparatus, which is portable and installable on a vehicle, for outputting data recorded in a disk-shaped recording medium to recording means comprising:
    reproducing means for reproducing data recorded in said disk-shaped recording medium,
    a sensor section for detecting a driving state of said vehicle, and
    control means for changing a reproducing speed of said reproducing means based on the result detected by said sensor section.

2. A reproducing apparatus, which is portable and installable on a vehicle, for outputting data recorded in a disk-shaped recording medium to recording means comprising:
    reproducing means for reproducing data recorded in said disk-shaped recording medium,
    a sensor section for detecting if said reproducing apparatus is installed on said vehicle, and
    control means for changing a reproducing speed of said reproducing means based on the result detected by said sensor section.

3. A method for controlling a reproducing apparatus, which is portable and installable on a vehicle, for outputting data recorded on a disk-shaped recording medium to recording means comprising the steps of:
    determining a driving state of vehicle based on the result detected by a sensor section,
    changing a reproducing speed of said reproducing means, which reproduces data recorded in said disk-shaped recording means according to the result detected by said determining step.

4. A method for controlling a reproducing apparatus, which is portable and installable on a vehicle, for outputting data recorded on a disk-shaped recording medium to recording means comprising the steps of:
    determining if said reproducing apparatus is installed on a vehicle based on the result detected by a sensor section,
    changing a reproducing speed of said reproducing means, which reproduces data recorded in said disk-shaped recording means according to the result detected by said determining step.

* * * * *